United States Patent [19]

Murase et al.

[11] Patent Number: 4,461,777
[45] Date of Patent: Jul. 24, 1984

[54] OIL-IN-WATER EMULSION

[75] Inventors: Itaru Murase; Tadakatsu Saisu, both of Saitama; Kinichi Hasegawa, Tokyo, all of Japan

[73] Assignee: Nippon Oil & Fats Co., Ltd., Tokyo, Japan

[21] Appl. No.: 409,805

[22] Filed: Aug. 20, 1982

[30] Foreign Application Priority Data

Aug. 20, 1981 [JP] Japan ................. 56-130746

[51] Int. Cl.$^3$ ............................................. A23D 5/00
[52] U.S. Cl. ................. 426/330.6; 426/570; 426/572; 426/602; 426/613
[58] Field of Search ............ 426/330.6, 570, 572, 426/602, 613

[56] References Cited

U.S. PATENT DOCUMENTS

| 3,883,670 | 5/1975 | Pennings et al. | 426/613 X |
| 4,199,605 | 4/1980 | Kahn et al. | 426/330.6 |
| 4,290,910 | 9/1981 | Harada et al. | 426/602 X |
| 4,341,811 | 7/1982 | Rule | 426/602 |

FOREIGN PATENT DOCUMENTS

| 55-153554 | 11/1980 | Japan | 426/330.6 |
| 2014426 | 8/1979 | United Kingdom | 426/602 |

*Primary Examiner*—Robert A. Yoncoskie
*Attorney, Agent, or Firm*—Sughrue, Mion, Zinn, Macpeak and Seas

[57] ABSTRACT

An oil-in-water emulsion comprising edible fats and oils, milk protein and/or vegetable protein, an emulsifier and water is disclosed. The emulsion further contains 0.2 to 6% by weight of amino acids and 3 to 40% by weight of saccharides. It is characterized by long shelf life and provides whipping cream and other creams having excellent storability.

9 Claims, No Drawings

OIL-IN-WATER EMULSION

FIELD OF THE INVENTION

The present invention relates to an oil-in-water emulsion and, more particularly, to an oil-in-water emulsion that can be kept in a sealed container for an extended time without spoiling and which can be used to provide whipping cream and other cream products with long storability.

BACKGROUND OF THE INVENTION

Whipping cream, coffee whiteners, chilled and frozen dessert cream, confectionary cream and cooking cream are conventionally made of natural cream, or a substitute synthetic cream prepared from animal and vegetable fats and oils. Some of these products may be comprised of a mixture of natural cream and synthetic cream. Both natural and synthetic cream are an aqueous emulsion of fine oil globules, generally referred to as an oil-in-water emulsion. Since the outer phase of these creams is an aqueous phase containing protein, they are easily infested with molds, bacteria and other microorganisms. These creams are usually sterilized by heating at temperatures of about 70° C. (sterilization at about 70° C. is hereinafter referred to as low-temperature sterilization). However, since these creams cannot contain preservatives, they easily putrefy during storage in today's complicated distribution system. Accordingly, they only retain their commercial value for a short period.

In order to increase the storability of these creams, products that have been subjected to high-temperature sterilization (hereunder HTST) or ultra-high-temperature sterilization (hereunder UHT) as described in J. G. Zadow, *The Australian Journal of Dairy Technology*, pages 44-49 (June, 1969) and M. L. Aggarwal, *J. Milk Food Technol.*, Vol. 38, No. 1, pages 36-38 (January, 1975) and which are packaged aseptically (such products are hereunder referred to as aseptic cream) have been introduced in the market. Aseptic cream can be stored in a sealed container for an extended period without spoiling. However, once the container is opened, the cream is contaminated by aerial microorganisms and putrefy very quickly. Natural cream and synthetic cream, as well as aseptic cream is perishable and whipped cream made therefrom gives off a detectable bad odor after 3 to 4 days of storage at 5° to 10° C. making it no longer commercially acceptable. Therefore, makers and distributors have always been harassed by the perishable nature of oil-in-water emulsions.

Although, long-keeping oil-in-water emulsions have been desired for many years, no perfect solution has been proposed. This is due to difficulties in improving the keeping quality of creams without impairing their performance, taste and flavor.

As a result of various studies to provide long-lived oil-in-water emulsions, the present inventors came to realize that improvements on the method of sterilization or packaging are not the right approach. Alternatively, the present inventors worked towards improving the composition of the oil-in-water emulsion itself. In connection with their work, the present inventors conducted many experiments on the antibacterial or microbiologically stable effect of adding natural compounds. Accordingly, the present inventors have found that the keeping quality of creams can be improved satisfactorily without impairing their characteristics and flavor by adding a combination of amino acids and saccharides to the creams.

SUMMARY OF THE INVENTION

The primary object of the present invention is to provide an oil-in-water emulsion comprising edible fats and oils, milk protein and/or vegetable protein, an emulsifier and water, said emulsion further containing 0.2 to 6% by weight of amino acids and 3 to 40% by weight of saccharides.

Another object of the invention is to provide an oil-in-water emulsion having excellent storability.

Yet another object of the invention is to provide an oil-in-water emulsion having good taste and flavor.

Another object of the present invention is to provide an oil-in-water emulsion having natural texture.

Another object of the invention is to provide an oil-in-water emulsion with good storability which has properties similar to natural oil-in-water emulsion such as cream.

DETAILED DESCRIPTION OF THE INVENTION

The amino acids used in the present invention include all types of amino acids such as those produced by decomposing natural proteins, those produced from microorganisms by fermentation, and synthetic amino acids. However, those derived from natural amino acids are preferred. Preferred amino acids are glycine, alanine, phenylalanine, tyrosine and serine, and they may be a D-form, L-form or DL-form. Particularly preferred amino acid is glycine. These amino acids may be used alone or in combination. These amino acids are used in an amount of 0.2 to 6% by weight based on the total weight of the oil-in-water emulsion, preferably 1 to 3% by weight. If they are used in an amount of less than 0.2% by weight, the desired antibacterial effect is not obtained. If they are used in an amount of more than 6% by weight, the flavor of the cream is impaired.

The saccharides used in the present invention are sugars and sugar alcohols. The sugars include monosaccharides, oligosaccharides and polysaccharides, and preferred examples are glucose, fructose, sucrose and maltose. Preferred sugar alcohols are sorbitol, mannitol, xylitol and maltitol. Particularly preferred saccharides are sorbitol and xylitol. These saccharides may be used alone, or if controlled sweetness is desired, they may be used in admixture. The saccharides are used in an amount of 3 to 40% by weight based on the total weight of the oil-in-water emulsion, preferably 10 to 30% by weight. If they are used in an amount of less than 3% by weight, the desired antibacterial effect is not obtained. If they are used in an amount of more than 40% by weight, the performance of the cream is impaired. The saccharides are believed to exhibit their antibacterial effect by osmosis. Their antibacterial effect is increased synergistically when they are used in combination with amino acids. Accordingly, by correctly combining the saccharides and amino acids the keeping quality of oil-in-water emulsions is improved remarkably. Particularly preferred combination is a combination of glycine with sorbitol and a combination of glycine with xylitol.

The edible fats and oils which can be used in connection with the present invention include animal fats/oils, vegetable fats/oils and processed products thereof. The edible fats and oils may be used alone or in admixture. Illustrative animal fats and oils include tallow, lard, milk fat, fish oil and whale oil. Illustrative vegetable fats and oils include soybean oil, cottonseed oil, corn oil, safflower oil, palm oil, palm kernel oil, rapeseed oil, kapok oil, and coconut oil. Processed fats and oils are those obtained by physical and chemical means such as fractional distillation, hydrogenation and rearrangement. The only requirement for the fats and oils to be useful in the present invention is that they have good flavor suitable for incorporation in foodstuffs. Any type of edible fat and oil produced by any method can be used if it meets this requirement. The edible fats and oils also should have metling points (capillary melting points) and SFI (Solid Fat Index) values within certain ranges, which are determined by the specific use of the oil-in-water emulsion.

To produce an oil-in-water emulsion that is used as whipping cream, edible fats and oils having melting points of 20° to 40° C. and SFI values between 10 and 70 at 10° C., between 5 and 60 at 15° C., and between 0 and 50 at 20° C. are used. In general, the edible fats and oils are used in an amount of 10 to 50% by weight based on the total weight of the oil-in-water emulsion. However, the amount of the edible fats and oils in the oil-in-water emulsion is determined by the specific use of the emulsion. If the emulsion is used as whipping cream, the edible fats and oils are used in an amount of 20 to 50% by weight; for coffee whiteners, the amount is from 10 to 35% by weight, and for cooking creams, the amount is from 10 to 50% by weight.

The milk protein used in the present invention is essentially fat-free milk or processed products thereof. Specific examples are non-fat dry milk, casein, sodium caseinate and whey protein. The vegetable protein used in the present invention may be made from wheat, as well as from oilseeds such as soybeans, peanuts, cotton seeds and corn. These proteins may be used alone or in combination. Milk protein is generally selected for making oil-in-water emulsions to be used as whipping cream, coffee whiteners and confectionary cream because it presents good flavor. Vegetable protein is generally selected for making emulsions to be used as cooking cream. The milk protein and/or vegetable protein is used in an amount of 0.5 to 10% by weight based on the total weight of the oil-in-water emulsion.

Examples of useful emulsifiers include synthetic emulsifiers such as fatty acid esters of glycerol, fatty acid esters of propylene glycol, fatty acid esters of sucrose and fatty acid esters of sorbitan, as well as natural emulsifiers such as soybean lecithin and yolk lecithin. These emulsifiers may be used in combination to provide a stable emulsion system. The emulsifier is used in an amount of 0.5 to 10% by weight based on the total weight of the oil-in-water emulsion.

In the present invention, a phosphate salt is preferably added to an aqueous phase prepared from the above described milk protein and/or vegetable protein, saccharides, amino acids and water. The primary effects of the phosphate salt are to block metal ions derived from milk protein or vegetable protein and to buffer the pH of the aqueous solution. However, the salt is also effective in minimizing the increase in viscosity of the emulsion to prevent it from becoming increasingly viscous and coagulating during storage or transport. Preferred phosphate salts include sodium phosphate dibasic, sodium phosphate tribasic, potassium phosphate dibasic and sodium hexametaphosphate; and there may be added as required. The phosphate salt is used in an amount of 0.1 to 2% by weight based on the total weight of the oil-in-water emulsion.

A stabilizer may be used as required to increase the viscosity of the oil-in-water emulsion or provide shape-retaining property (body) or resiliency (stickiness) for the product in which the emulsion is used. Preferred stabilizers include gums, gelatin, agar, carrageenin, metal salts of alginic acid, alginate esters and cellulose. These stabilizers may be used alone or in combination. The stabilizer is used in an amount of 0.01 to 5% by weight based on the total weight of the oil-in-water emulsion.

The oil-in-water emulsion of the present invention is prepared by first dispersing in water the saccharide, milk protein and/or vegetable protein and amino acid. Preferably, a phosphate salt and stabilizer are included in the dispersion. The dispersion is heated to produce an aqueous phase, and fats and oils in solution are added to the aqueous phase. The mixture is emulsified under stirring. This preliminary emulsifying step is effected at a temperature between 65° and 75° C. An emulsifier may be added to either the aqueous phase or oily phase. Alternatively, a hydrophilic emulsifier is added to the aqueous phase and a lipophilic emulsifier is added to the oily phase, or the emulsifier may be added to the preliminary emulsion.

Whichever method is used, the important thing is that the emulsifier be dispersed or dissolved uniformly without forming a cake (pilling). Stirring for the preliminary emulsification may be effected with a suitable machine such as an agitator or high-speed emulsifier. The preliminary emulsion is then subjected to high-pressure homogenization with a homogenizer, and quenched to form the oil-in-water emulsion of the present invention.

A suitable sterilization step may be incorporated either before or after the homogenizing step. Any sterilization method may be used, such as low-temperature sterilization, HTST or UHT. The oil-in-water emulsion is then aged in a refrigerator, usually at least overnight at 10° C. or less. In general, the aged emulsion is stored and transported at between 5° and 10° C. Alternatively, the emulsion may be stored and transported in a frozen state, and thawed in a refrigerator at between 5° and 10° C., one day before using.

The oil-in-water emulsion of the present invention is suitable for use as whipping cream, coffee whiteners, chilled and frozen dessert cream, confectionary cream and cooking cream. The emulsion is not as perishable as natural cream and other conventional creams. Its storability is particularly noteworthy. An emulsion of the invention can be stored in a sealed container at between 5° and 10° C. as long as 2 to 3 months without seeing any mold or bacterial growth. If the container is opened, it can be stored for 10 to 14 days at between 5° and 10° C. without mold or bacterial growth. The emulsion of the present invention is very stable and easy to handle since its viscosity is not increased and no curds are formed in spite of the temperature variations or vibrations that accompany long-term storage or long-distance transport. These features of the emulsion of the present invention will greatly benefit the makers and distributors of oil-in-water emulsions as well as the end users.

The present invention is now described in greater detail by reference to the following examples and comparative examples to which the present invention is by no means limited.

EXAMPLE 1

A mixture of 200 kg of purified hardened coconut oil (melting point: 34.7° C., SFI value: 66.6 at 10° C., 59.2 at 15° C. and 46.7 at 20° C.) and 200 kg of purified hardened rapeseed oil (melting point: 36° C., SFI value: 38.9 at 10° C., 29.7 at 15° C. and 23.5 at 20° C.) was melted with heat. To the molten mixture, 1,000 g of glycerol mono unsaturated fatty acid ester (iodine value: 80, purity: 90%), 800 g of glycerol mono saturated fatty acid ester (iodine value: 2, purity 90%) and 1,600 g of soybean lecithin were added, and dissolved to make an oily phase.

To 330 kg of water, 200 kg of sorbitol (70% aqueous solution), 40 kg of non-fat dry milk, 5 kg of sodium caseinate, 20 kg of glycine, 300 g of sucrose fatty acid ester (HLB: 11) and 2 kg of sodium hexametaphosphate were added, and the mixture was heated to form an aqueous phase. The previously prepared oily phase was put in the aqueous phase, and the mixture was stirred at 75° C. for 15 minutes to make a preliminary emulsion which was then sterilized. The emulsion was homogenized at 75° C. and a pressure of 150 kg/cm$^2$ with a high-pressure homogenizer from Sanwa Kikai K.K. (1,800 l/hr). The homogenized emulsion was immediately quenched to 10° C. or less to form an oil-in-water emulsion.

The emulsion was tested for its shelf life and keeping quality after it was unpackaged. The emulsion was also tested for its performance as whipping cream. Table 1 shows the result of the shelf life test; Table 2 shows the result of the keeping quality of test; and Table 3 shows the results of the evaluation of the physical properties and performance of the emulsion when it was used as whipping cream and other creams.

EXAMPLE 2

A mixture of 250 kg of purified lard (melting point: 33° C., SFI value: 27.3 at 10° C., 21.2 at 15° C. and 15.1 at 20° C.) and 50 kg of purified hardened palm oil (melting point: 33.6° C., SFI value: 72.8 at 10° C., 67.4 at 15° C. and 60.5 at 20° C.) was melted with heat. To the molten mixture, 350 g of glycerol mono saturated fatty acid ester (iodine value: 1, purity: 60%), 350 g of propylene glycol mono saturated fatty acid ester (iodine value: 0.8, purity: 90%), 530 g of polyglycerol fatty acid ester (iodine value: 0.6, hydroxy value: 280) and 2,100 g of soybean lecithin were added, and dissolved to make an oily phase. To 430 kg of water, 150 kg of mannitol (70% aqueous solution), 20 g of sucrose, 3 kg of glycine, 40 kg of non-fat dry milk, 5 kg of soybean protein and 2 kg of sodium hexametaphosphate were added, and the mixture was heated to form an aqueous phase. The previously prepared oily phase was put in the aqueous phase, and the resulting mixture was treated as in Example 1 to form oil-in-water emulsion. The emulsion was aged in a refrigerator for 20 hours and yet it had good properties suitable for use in whipping cream, coffee whitener, chilled or frozen dessert cream and cooking cream (see Table 3). The emulsion also gave good results in a shelf life test and keeping quality test (see Tables 1 and 2).

EXAMPLE 3

A mixture of 300 kg of hardened palm kernel oil (melting point: 33.6° C., SFI value: 72.8 at 10° C., 67.4 at 15° C. and 60.5 at 20° C.) and 150 kg of palm oil (melting point: 35.2° C., SFI value: 40.3 at 10° C., 26.0 at 15° C. and 19.0 at 20° C.) was melted with heat. To the molten mixture, 540 g of glycerol mono saturated fatty acid ester (iodine value: 1, purity: 90%), 450 g of glycerol mono unsaturated fatty acid ester (iodine value: 80, purity: 90%), 2,000 g of sorbitan saturated fatty acid ester (monoester content: 70%) and 3,600 g of soybean lecithin were added, and dissolved to make an oily phase. To 280 kg of water, 130 kg of sorbitol (70% aqueous solution), 70 kg of glucose, 30 kg of non-fat dry milk, 30 kg of L-alanine, 360 g of sucrose fatty acid ester (HLB: 14) and 2 kg of sodium hexametaphosphate were added, and the mixture was heated to form an aqueous phase. The previously prepared oily phase was put in the aqueous phase, and the resulting mixture was treated as in Example 1 to form an oil-in-water emulsion. The emulsion was aged in a refrigerator for 20 hours, and yet it had good properties suitable for use in whipping cream (see Table 3). The emulsion also gave good results in a shelf life test and keeping quality test (see Tables 1 and 2).

EXAMPLE 4

The same procedure as Example 1 was carried out except that 200 kg of xylitol (70% aqueous solution) was used in place of 200 kg of sorbitol (70% aqueous solution). The results are shown in Tables 1 to 3.

COMPARATIVE EXAMPLE 1

The emulsion formulation of Example 1 was used, except that it contained 250 kg of sorbitol (70% aqueous solution), 500 g of glycine and 300 kg of water. This formulation was treated as in Example 1 to form an oil-in-water emulsion.

COMPARATIVE EXAMPLE 2

The emulsion formulation of Example 1 was used, except that it contained 40 kg of glycine and 530 kg of water but did not contain sorbitol. This formulation was treated as in Example 1 to form an oil-in-water emulsion.

COMPARATIVE EXAMPLE 3

A commercial product of whipping cream (which is not a long life type cream (i.e., not aseptic cream), and which contains 4.0 wt% milk protein, 18.0 wt% milkfat, 27.0 wt% vegetable fat/oil and remainder of emulsifier and water and which was sterilized at 75° C. for 15 minutes) was used.

COMPARATIVE EXAMPLE 4

A commercial product of aseptic cream (which is a long life type cream (i.e., aseptic cream), and which contains 4.0 wt% milk protein, 2.0 wt% milkfat, 43.0 wt% vegetable fat/oil and remainder of emulsifier and water and which was sterilized at 145° C. for 3 seconds by UHT) was used after it was whipped.

Samples of Comparative Examples 1 to 4 were subjected to the same tests as in Examples 1 to 4. The results are shown in Tables 1 to 3.

TABLE 1

Shelf Life of Cream

| Days Passed | Example 1 | Example 2 | Example 3 | Example 4 | Comparative Example 1 | Comparative Example 2 | Comparative Example 3 | Comparative Example 4 |
|---|---|---|---|---|---|---|---|---|
| 5 | − | − | − | − | − | − | − | − |
| 10 | − | − | − | − | − | − | + | − |
| 15 | − | − | − | − | − | − | ++ | − |
| 20 | − | − | − | − | + | − | ++ | − |
| 25 | − | − | − | − | ++ | ± | ++ | ± |
| 30 | − | − | − | − | ++ | ++ | ++ | ++ |
| 35 | − | − | − | − | | | | |
| 40 | − | − | − | − | | | | |
| 45 | − | − | − | − | | | | |
| 50 | − | − | − | − | | | | |
| 55 | − | − | − | − | | | | |
| 60 | − | − | − | − | | | | |
| 70 | − | − | − | − | | | | |
| 80 | − | − | − | − | | | | |
| 90 | − | ± | ± | − | | | | |
| 100 | ± | + | + | ± | | | | |
| 110 | ± | ++ | ++ | ± | | | | |

Shelf Life Test Method

A polypropylene bottle (capacity: 1.2 l) was charged with 1 kg of the homogenized oil-in-water emulsion, sealed with a cap and left in a refrigerator (5–10° C., ave. 6.5° C.). The sample was checked for any smell of putrefaction and mold every 5 days for the first 60 days, and every 10 days thereafter.

Key to the Symbols in Table 1
−: OK
±: Slight smell of putrefaction was sensed.
+: Moldy or smell of putrefaction was sensed.
++: Distinct mold growth or smell of putrefaction.

TABLE 2

Keeping Quality of Whipped Cream

| Temperature | Days Passed | Example 1 | Example 2 | Example 3 | Example 4 | Comparative Example 1 | Comparative Example 2 | Comparative Example 3 | Comparative Example 4 |
|---|---|---|---|---|---|---|---|---|---|
| 10° C. | 1 | − | − | − | − | − | − | − | − |
| " | 2 | − | − | − | − | − | − | − | − |
| " | 3 | − | − | − | − | − | − | ± | − |
| " | 4 | − | − | − | − | ± | ± | + | ± |
| " | 5 | − | − | − | − | + | + | + | + |
| " | 6 | − | − | − | − | ++ | ++ | ++ | ++ |
| " | 7 | − | − | − | − | | | | |
| " | 8 | − | − | − | − | | | | |
| " | 9 | − | − | − | − | | | | |
| " | 10 | − | − | − | − | | | | |
| " | 11 | − | − | − | − | | | | |
| " | 12 | − | − | − | − | | | | |
| " | 13 | − | − | − | − | | | | |
| " | 14 | − | − | − | − | | | | |
| 20° C. | 1 | − | − | − | − | − | − | − | − |
| " | 2 | − | − | − | − | ± | ± | + | ± |
| " | 3 | − | − | − | − | + | + | + | + |
| " | 4 | − | − | − | − | ++ | ++ | ++ | ++ |
| " | 5 | − | − | − | − | | | | |
| " | 6 | − | − | − | − | | | | |
| " | 7 | − | − | − | − | | | | |
| " | 8 | − | − | − | − | | | | |
| " | 9 | − | − | − | − | | | | |
| " | 10 | − | ± | ± | − | | | | |

Keeping Quality Test Method

The homogenized oil-in-water emulsion (1 kg) was whipped to maximum overrun with a cake mixer from Kanto Kongoki K.K., and 30 g of the whipped cream was put in a polystyrene container (capacity: 120 cc). The container was sealed and kept at 10° C. or 20° C. From the second day onward, the sample was checked daily for any smell of putrefaction and mold growth. The symbols used in Table 2 have the same meaning as in Table 1.

As shown in Tables 1 and 2, the samples of the present invention that contained amino acids combined with suitable amounts of saccharides could be kept in a closed container without deterioration for at least 80 days, about 4 times as long as the shelf life of the comparative samples. The whipped cream made from the samples of the present invention also had much better keeping quality than the whipped cream made from the comparative samples, and the former could be kept without putrefaction at least three times as long as the latter.

TABLE 3

Evaluation of Physical Properties and Performance of Cream

| Sample | Example 1 | Example 2 | Example 3 | Example 4 | Comparative Example 1 | Comparative Example 2 | Comparative Example 3 | Comparative Example 4 |
|---|---|---|---|---|---|---|---|---|
| Cream viscosity[1] (CP) | 120 | 95 | 173 | 140 | 104 | 88 | 137 | 132 |
| Viscosity after[2] heat shock (CP) | 119 | 98 | 167 | 130 | 796 | coagulated | 674 | coagulated |
| Performance of whipping cream | | | | | | | | |
| Whipping time[3] (min:sec) | 4:35 | 5:05 | 4:10 | 3:50 | 2:20 | 2:00 | 4:35 | 4:00 |
| Overrun (%)[4] | 157 | 172 | 146 | 140 | 129 | 113 | 154 | 162 |
| Shape[5] retention | good | good | good | good | poor | poor | good | good |
| Flavor | good | good | good | good | good | bitter | good | good |
| Applicability to other creams | fair | good | fair | fair | poor | poor | fair | fair |

Notes to Table 3
[1] Viscosity after ageing at 7° C. for 20 hours was measured with a Brookfield viscometer from Tokyo Keiki Seizosho. The samples of Comparative Examples 3 and 4 were 2 days old when their viscosity was measured at 7° C.
[2] Viscosity was measured after leaving the samples at 32° C. for 3 hours, then at 7° C. for 24 hours.
[3] The time when maximum overrun was reached by whipping with a cake mixer.

$$[4]\ \text{Overrun (\%)} = \frac{\left(\begin{array}{c}\text{weight of a given volume} \\ \text{of unwhipped cream}\end{array}\right) - \left(\begin{array}{c}\text{weight of whipped cream of} \\ \text{the same volume}\end{array}\right)}{\text{weight of whipped cream of the same volume}} \times 100$$

[5] Whipped cream was squeezed in a predetermined pattern of decoration and kept at 20° C. for 2 hours, and its shape retention was checked.

As Table 3 shows, the oil-in-water emulsion samples of the present invention could be used as whipping cream that had physical properties and performance equal to or better than the commercial cream. They also had good performance suitable for use in other creams such as coffee whiteners, chilled or frozen dessert cream and cooking cream.

While the invention has been described in detail and with reference to specific embodiments thereof, it will be apparent to one skilled in the art that various changes and modifications can be made therein without departing from the spirit and scope thereof.

What is claimed is:

1. An edible oil-in-water emulsion, comprising:
water;
edible fats and oils dispersed in the water in the form of an emulsion;
milk protein and/or vegetable protein;
an emulsifier; and an antibacterial combination of amino acids and saccharides consisting of,
0.2 to 6% by weight of one or more amino acids based on the weight of the emulsion; and
3 to 40% by weight of saccharides based on the weight of the emulsion.

2. An edible oil-in-water emulsion as claimed in claim 1, wherein the amino acid is selected from the group consisting of glycine, alanine, phenylalanine, tyrosine and serine and mixtures thereof.

3. An edible oil-in-water emulsion as claimed in any of claims 1 or 2, wherein the saccharides are selected from the group consisting of sorbitol, mannitol, xylitol, maltitol, sucrose, glucose, fructose and maltose and mixtures thereof.

4. An edible oil-in-water emulsion as claimed in claim 3, wherein the edible oil-in-water emulsion contains edible fats and oils having melting points of 20° to 40° C. and SFI values between 10 and 70 at 10° C., between 5 and 60 at 15° C., and between 0 and 50 at 20° C.

5. An edible oil-in-water emulsion as claimed in claim 3, wherein the emulsion contains edible fats and oils in an amount of from 10 to 50 % by weight based on the weight of the emulsion.

6. An edible oil-in-water emulsion for use as a whipping cream as claimed in claim 3, wherein the emulsion for whipping cream contains edible fats and oils in an amount of 20 to 50% by weight based on the weight of the emulsion.

7. An edible oil-in-water emulsion for use as a coffee whitener as claimed in claim 3, wherein the emulsion for coffee whiteners contains edible fats and oils in an amount of 10 to 35% by weight based on the weight of the emulsion.

8. An edible oil-in-water emulsion for use as a cooking cream as claimed in claim 3, wherein the emulsion for cooking creams contains edible fats and oils in an amount of from 10 to 50% by weight based on the weight of the emulsion.

9. An edible oil-in-water emulsion as claimed in claim 3, further comprising minor amounts of a phosphate salt.

* * * * *